(12) United States Patent
Ulseth et al.

(10) Patent No.: US 10,076,212 B2
(45) Date of Patent: Sep. 18, 2018

(54) TONGS UTENSIL WITH SPATULA MEMBER

(71) Applicant: Enhance Product Development, Inc., Minneapolis, MN (US)

(72) Inventors: Andrew John Ulseth, Richfield, MN (US); Trevor John Lambert, Brooklyn Park, MN (US)

(73) Assignee: ENHANCE PRODUCT DEVELOPMENT, INC., Minneapolis, MN (US)

( * ) Notice: Subject to any disclaimer, the term of this patent is extended or adjusted under 35 U.S.C. 154(b) by 0 days.

(21) Appl. No.: 15/449,633

(22) Filed: Mar. 3, 2017

(65) Prior Publication Data
US 2017/0251882 A1 Sep. 7, 2017

Related U.S. Application Data

(60) Provisional application No. 62/303,512, filed on Mar. 4, 2016.

(51) Int. Cl.
*A47J 43/28* (2006.01)

(52) U.S. Cl.
CPC ........... *A47J 43/283* (2013.01); *A47J 43/288* (2013.01)

(58) Field of Classification Search
CPC .................................................. A47J 43/283
USPC ....... 294/3, 7, 8, 16, 99.2; 30/147, 150, 149, 30/279.6; D7/688, 692, 388, 690
See application file for complete search history.

(56) References Cited

U.S. PATENT DOCUMENTS

| | | | | |
|---|---|---|---|---|
| 536,521 A * | 3/1895 | Hayes | ..................... | A47J 17/02 294/7 |
| 582,852 A * | 5/1897 | Dodge | .................. | A47J 43/283 294/8 |
| 594,205 A * | 11/1897 | Heberling | ............. | A47J 43/283 294/8 |
| 625,934 A * | 5/1899 | Middlekarff | .......... | A47J 43/283 294/8 |
| 627,536 A * | 6/1899 | Schultz | ................. | A47J 43/283 294/8 |
| 778,904 A * | 1/1905 | Seffens | ................. | A47J 43/283 16/434 |
| 892,237 A * | 6/1908 | Fairall et al. | ......... | A47J 43/283 294/8 |
| D39,441 S * | 8/1908 | Bain | ............................... | 294/15 |
| 1,353,307 A * | 9/1920 | Berger | .................. | A47J 43/288 294/49 |
| D114,369 S * | 4/1939 | Moyer | ......................... | D7/690 |
| 3,760,501 A * | 9/1973 | Johnston | ............... | A47J 43/283 294/55.5 |
| 4,205,870 A * | 6/1980 | Conner | .................. | A47J 43/283 294/7 |
| 2004/0239129 A1* | 12/2004 | Sumter | .................. | A47G 21/10 294/16 |

* cited by examiner

*Primary Examiner* — Paul T Chin
(74) *Attorney, Agent, or Firm* — Kagan Binder, PLLC

(57) ABSTRACT

A kitchen utensil is described which provides the functions of food tongs and a spatula in one device. The single utensil gives the user the ability to hold a food item with the utensil, which may be hot or difficult to hold with one hand, and to be able to pick it up, flip or move it to a serving dish or tray due to a hammock configuration provided at distal ends of a pair of tong arms.

19 Claims, 9 Drawing Sheets

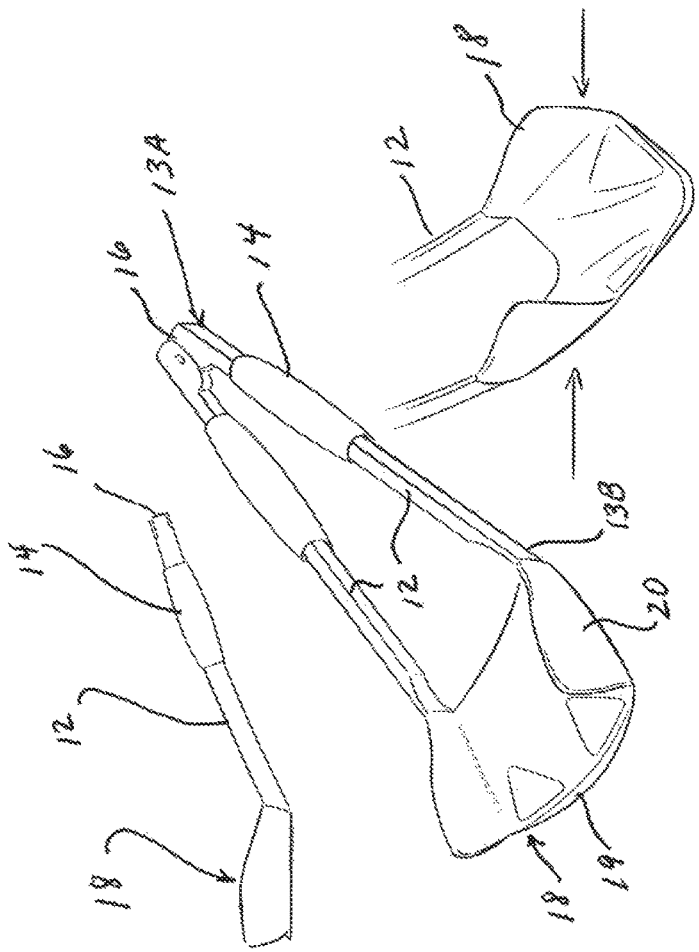

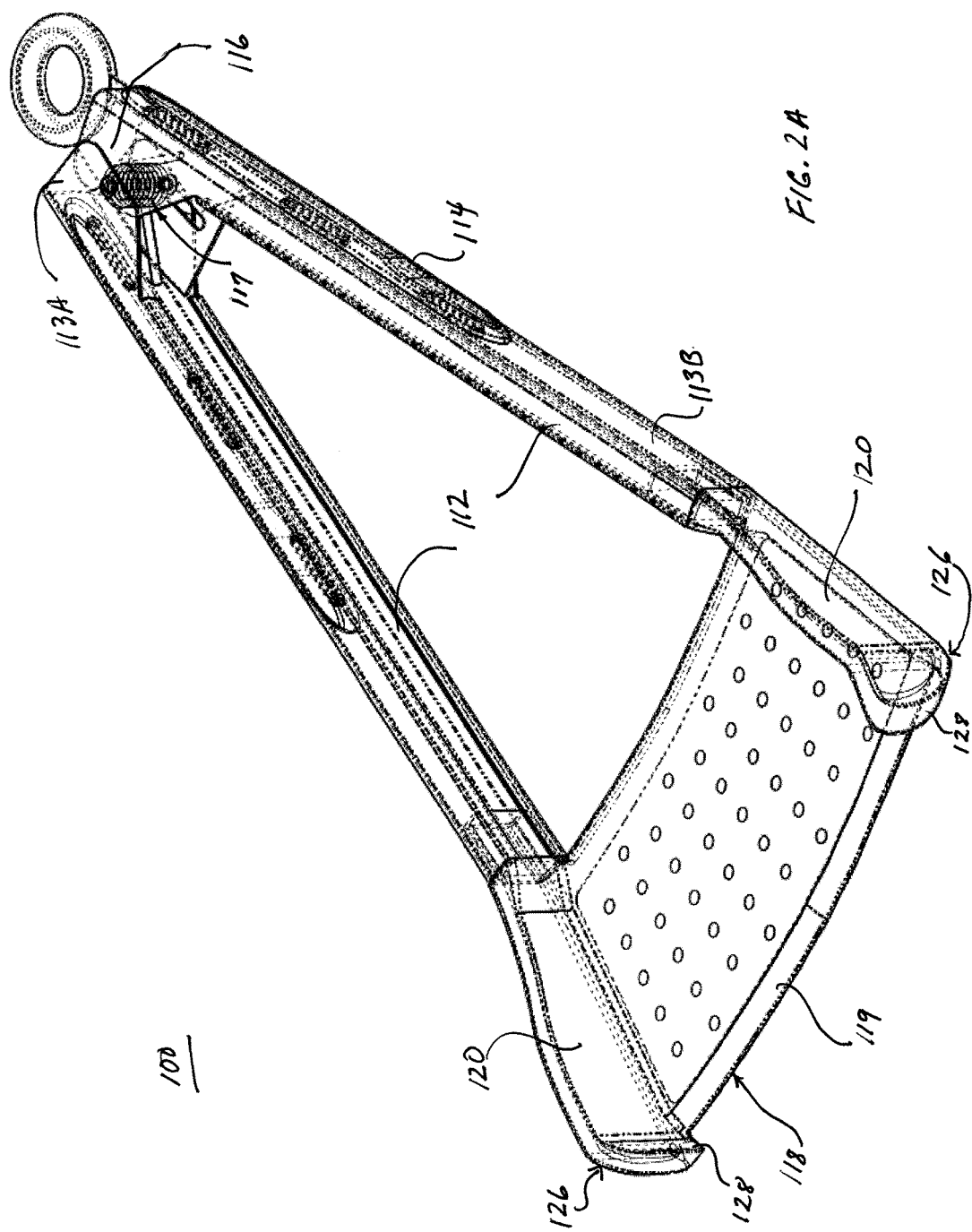

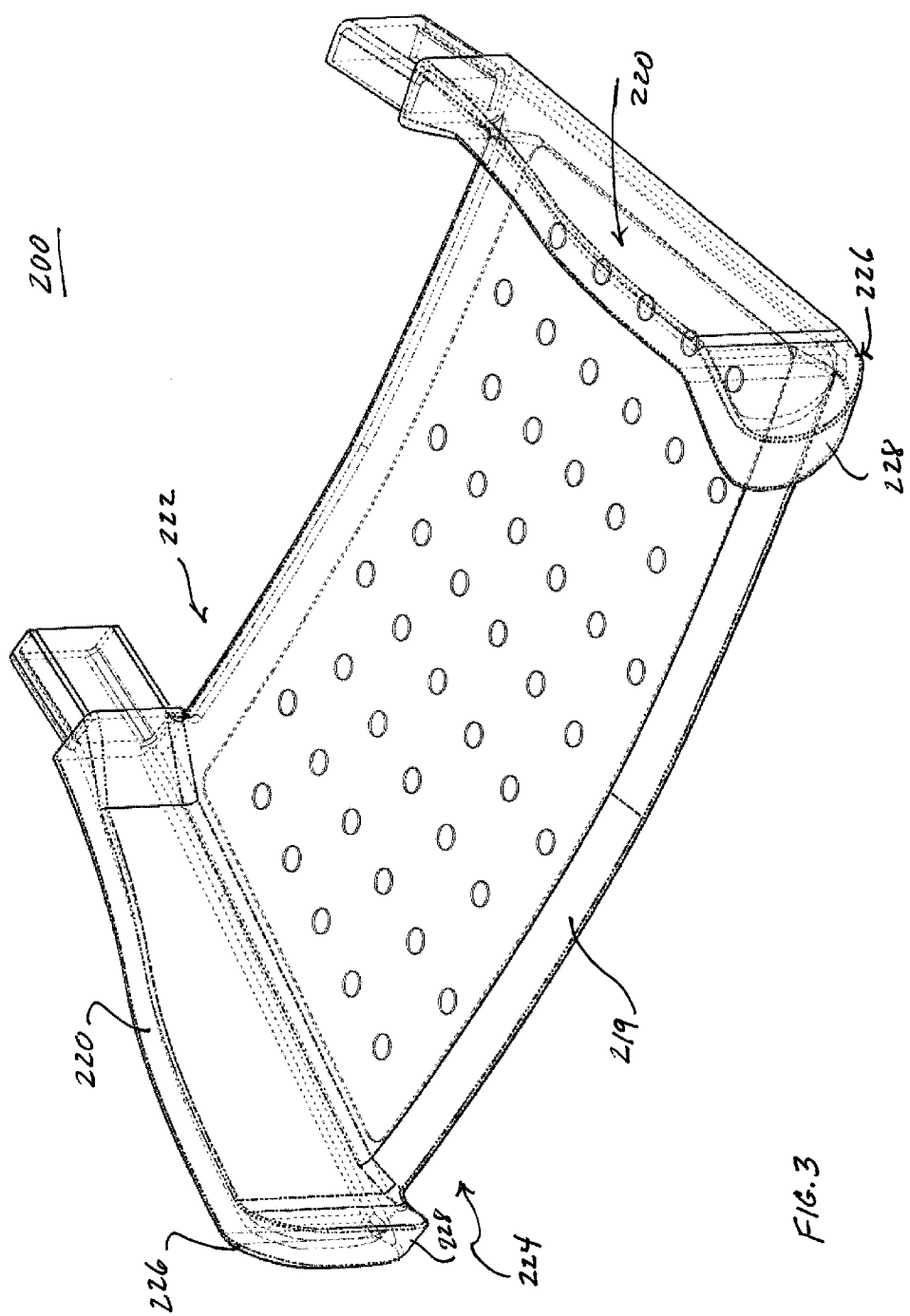

TONGS UTENSIL WITH SPATULA MEMBER

CLAIM OF PRIORITY

This application claims priority to and the benefit of a U.S. Provisional Application with Ser. No. 62/303,512, filed on Mar. 4, 2016, which is incorporated herein by reference in its entirety.

FIELD OF THE INVENTION

The invention relates generally to a kitchen utensil which combines the functions of a tong and a spatula in one device.

BACKGROUND

Currently there are a number of solutions for food manipulation and gripping while cooking. One of these solutions attempts to use tongs to move food around while cooking and onto a plate, bun or taco shell, but this solution fails to meet the needs of the market because loose meat or other food items can be dropped and not gripped well enough with tongs. Another solution to picking up these food items attempts to use a plain spatula, but this solution is similarly unable to meet the needs of the market because it can be hard to slide food onto and off of the spatula. It would be advantageous to have an apparatus that is one utensil that replaces two utensils, freeing up space in overcrowded kitchen drawers.

SUMMARY OF THE INVENTION

It would be advantageous to have an apparatus that grips like tongs and has the surface area of a spatula. Further, it would be advantageous to have an apparatus that is a tong with a silicone hammock between the arms creating a bendable or gripping spatula surface. Therefore, there currently exists a need in the market for an apparatus that is a set of tongs with a hammock attached to the distal end of the arms that functions as a spatula and which bends creating optimal grip for loose food items that need to be moved from one cooking vessel or container to a bun, or shell, as well as allows for the food to be placed with greater precision.

In one example embodiment, a kitchen utensil is provided that includes a pair of arms having a first and second ends, the first ends of the pair of arms forming a cantilevering V-joint that facilitates lateral inward and outward movement of each of the arms when an external force is applied on the arms. The kitchen utensil also includes a spatula head member having a flexible planar portion bounded by two elongate sidewall members, the spatula head member having a proximal end and a distal end, wherein the distant end is located at and engages the second ends of the pair of arms at each elongate sidewall member. The cantilevering V-joint includes a spring member dispose therein to outwardly bias the second ends of the pair of arms such that the spatula head member forms a spatula confirmation when the arms are extended laterally outward. The spatula head member is formed from two interleaving and cooperating members to form a flexible holding spatula configuration when the arms are moved laterally inward. A distal end of each of the sidewall members includes a gripping member that extends outwardly from the distal end of each sidewall member and the spatula configuration. In a related embodiment, a distal end of each of the sidewall members includes an a gripping member that extends outwardly from the distal end of each sidewall member and the spatula configuration, wherein each of the gripping members further extend inwardly towards each other In another example embodiment, a kitchen utensil is provided including a pair of arms having a first and second ends, the first ends of the pair of arms forming a cantilevering V-joint that facilitates lateral inward and outward movement of each of the arms when an external force is applied on the arms. The utensil further includes a spatula head member having a flexible planar portion bounded by two elongate side wall members, the spatula head member having a proximal end and a distal end, wherein the distant end is located at and engages the second ends of the pair of arms at each elongate side wall member. The spatula head member forms a spatula confirmation when the arms are extended laterally outward. In a related embodiment, the cantilevering V-joint includes a spring member disposed therein allowing inward and outward movement of the arms in varying degrees. In another related embodiment, a distal end of each of the sidewall members includes a gripping member that extends outwardly from the distal end of each sidewall member and the spatula configuration. In yet another related embodiment, a distal end of each of the sidewall members includes a gripping member that extends outwardly from the distal end of each sidewall member and the spatula configuration, each of the gripping members further extending inwardly towards each other. In another embodiment, the spatula head member is formed from two interleaving and cooperating members to form a spatula configuration flexible holding configuration when the arms are moved laterally inward.

In a related example embodiment, a spatula head member is provided that is configured to be fitted on an open end of a tongs utensil having a spring biased v-joint cantilevering configuration. The spatula head member includes a flexible planar portion bounded by two elongate side wall members with the spatula head member having a proximal end and a distal end. The distant end of the spatula head member is configured to be located at and engaged with an open end of the tongs utensil at each elongate side wall member. The spatula head member forms a spatula confirmation when the tongs are in an open position, a distal end of each of the sidewall members including a gripping member that extends outwardly from the distal end of each sidewall member and the spatula configuration. In a related embodiment, each sidewall member is configured to include an elongate channel that is flexible to facilitate positioning of the spatula head member over each of the second ends of the tongs utensil to thereby form the spatula configuration. In this example embodiment, a distal end of each of the sidewall members includes a gripping member that extends outwardly from the distal end of each sidewall member and the spatula configuration, with each of the gripping members further extending inwardly towards each other. The inwardly extending portions of the gripping members help to grasp individual food items when the spatula head member and the tongs utensil are used in an upside down manner.

The invention advantageously fulfills the aforementioned deficiencies by providing a kitchen utensil that incorporates a silicone hammock between the two arms of the tongs. When taunt, this hammock creates a rigid scooping and holding surface that can be used to move or flip food. The utensil has additional features such as ridges/teeth at the tips of the tong arms or spatula head to help break apart meat or other food items. The apparatus may further incorporate living hinges and stability ridges to increase the stability and usability of the spatula hammock.

Among other things, it is an advantage of the invention to provide a kitchen utensil having spatula hammock that is made from silicone to resist heat and protect from melting the spatula material.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIGS. 1A-1C illustrate a perspective, side and closed perspective views of a kitchen utensil in a spatula-tong configuration according to the teachings herein;

FIGS. 2A-2B illustrate a perspective view and an exploded view, respectively, of second embodiment of a kitchen utensil in a spatula-tong configuration according to the teachings herein;

FIG. 3 illustrates a perspective view of an embodiment of a spatula-tong head member configured for mounting on an existing pair of tongs according to the teachings herein.

DETAILED DESCRIPTION OF THE INVENTION

Figure 2B:
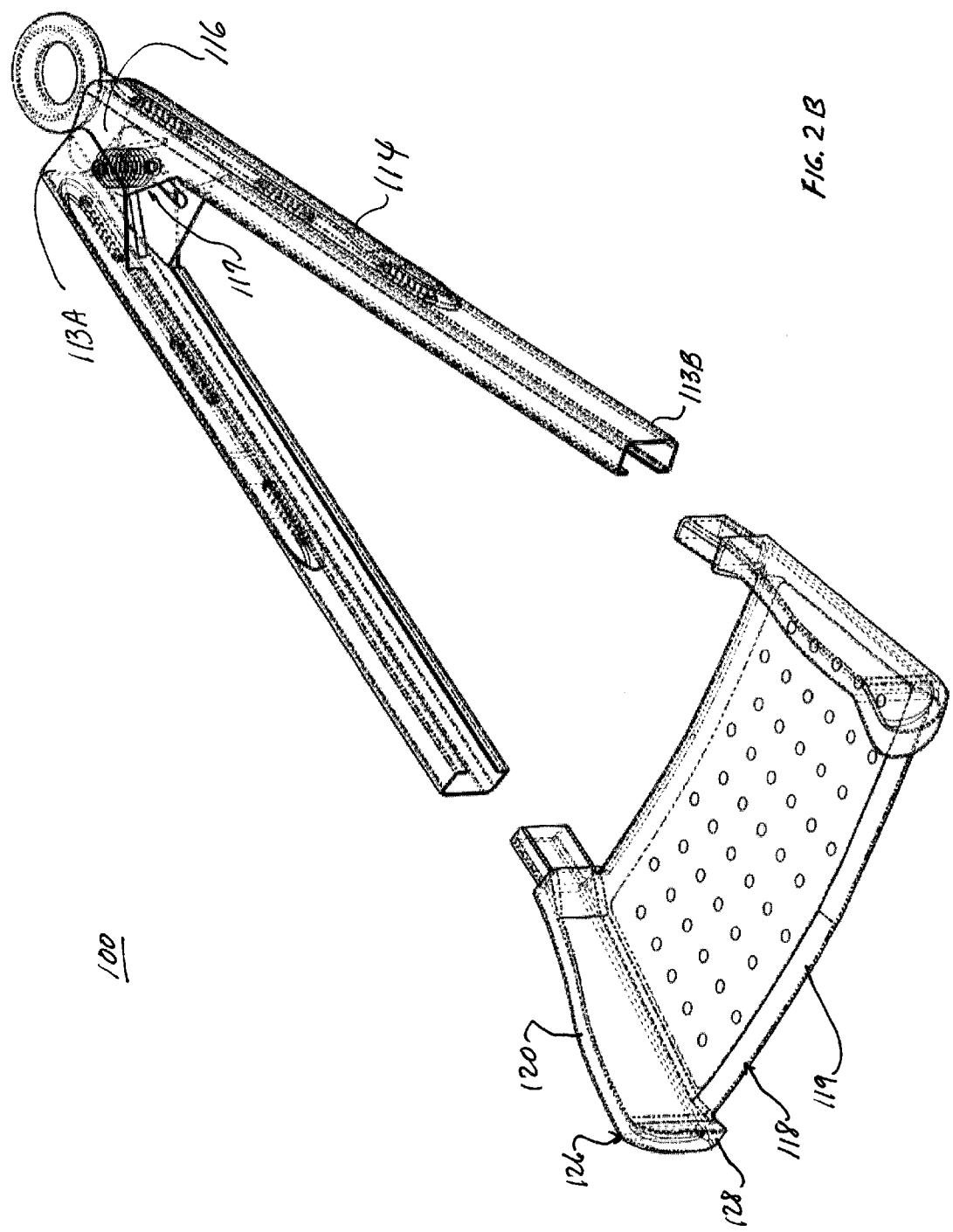
Figure 4:
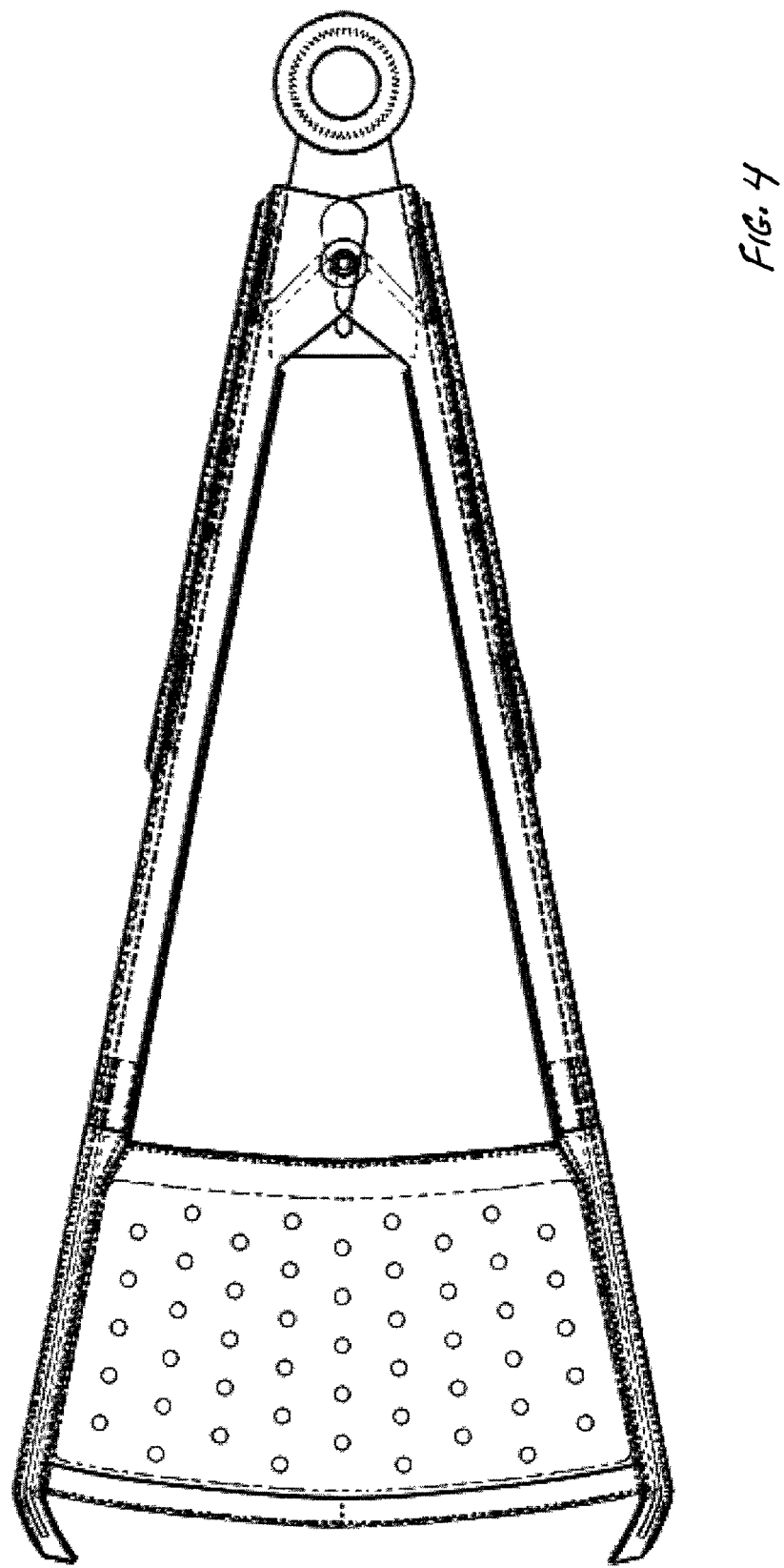
FIGS. 4-8 illustrate top, side, back, bottom and front assembly views of the second embodiment of a kitchen utensil in a spatula-tong configuration according to the teachings herein.
Figure 5:
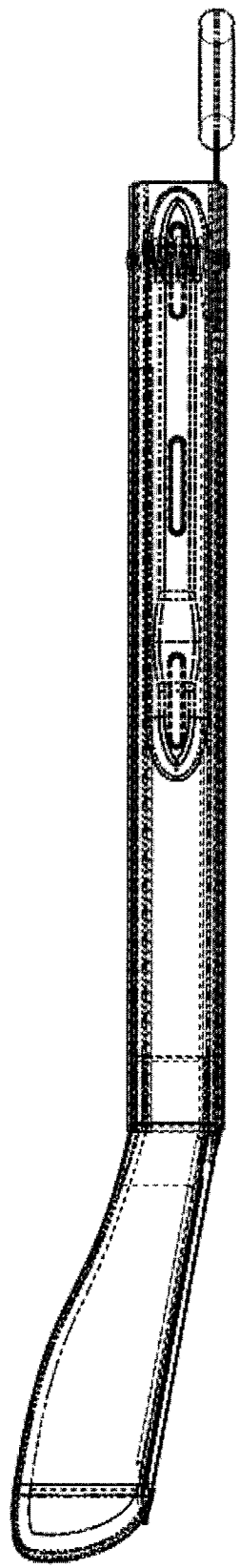
Figure 6:
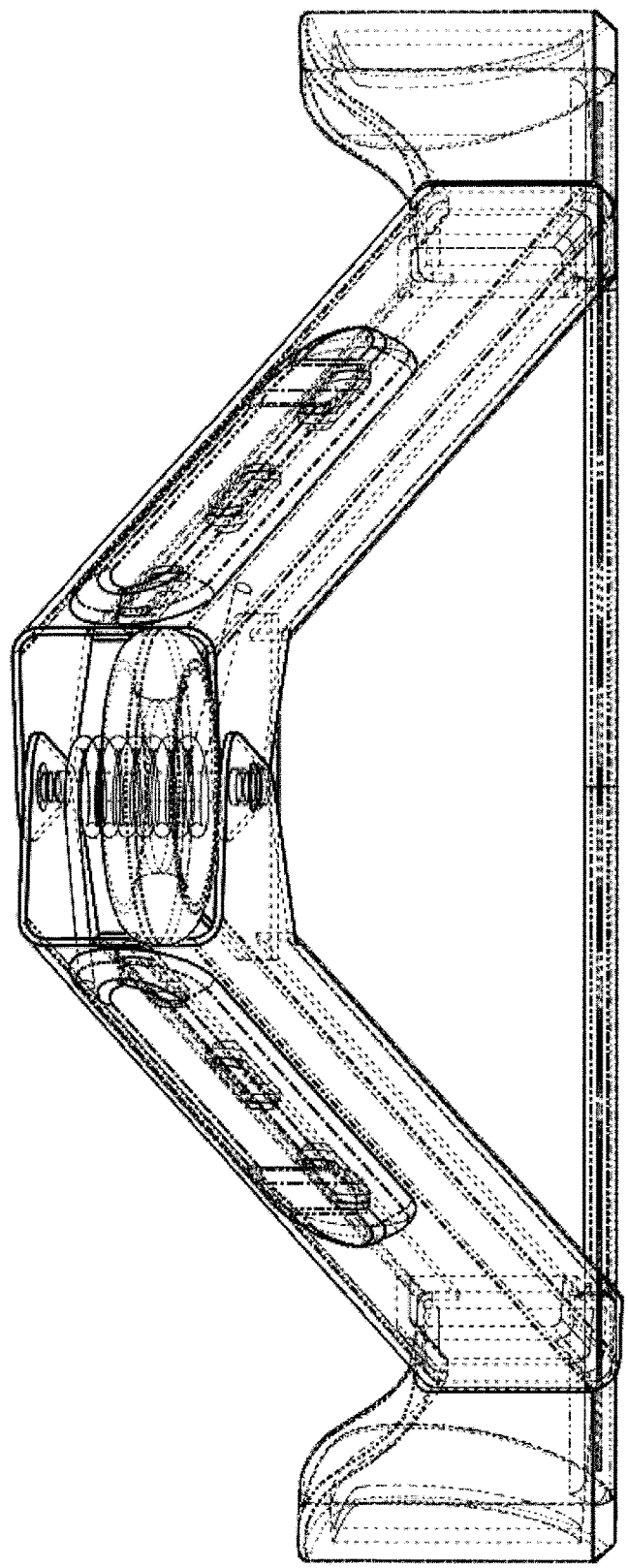
Figure 7:
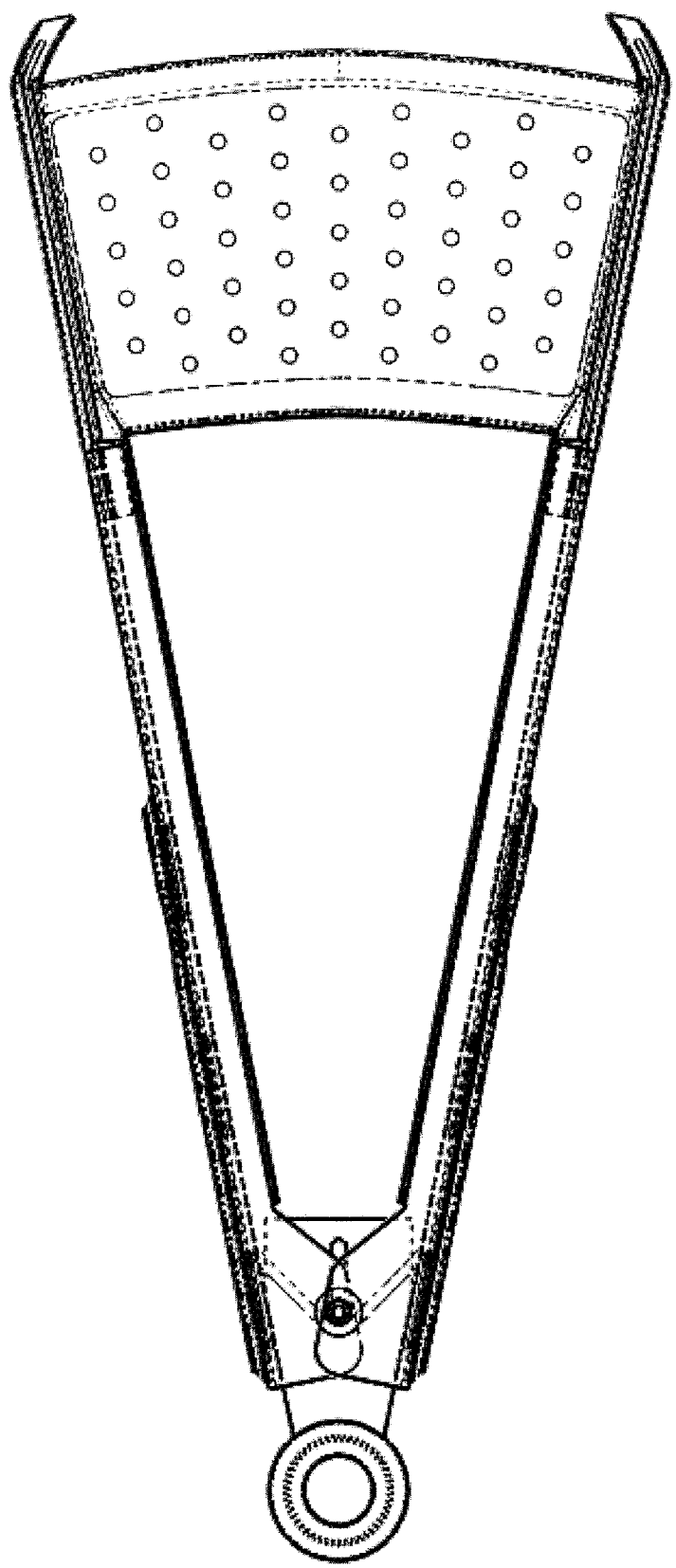
Figure 8:
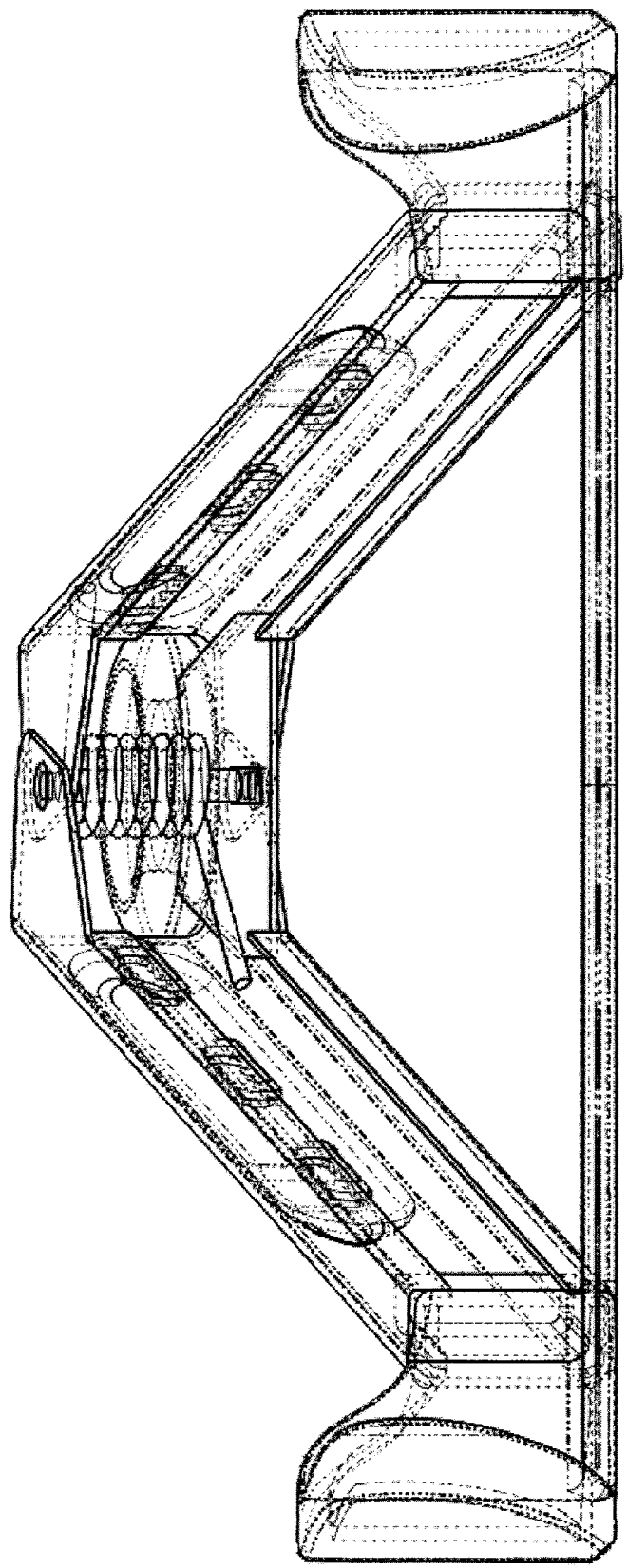

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The various embodiments of the invention described herein are directed to be a kitchen utensil which generally combines the functions of a tong and a spatula in one device but provides a synergistic result of giving the user the ability to hold a food item with the utensil, which may be hot or difficult to hold with one hand, and to be able to pick it up, flip or move it to a serving dish or tray due to the hammock configuration provided at the distal ends of the arms. In a related embodiment, the spatula head is more of a mesh that increases the "holding" or gripping ability of the kitchen utensil and allows for picking up items in hot water or grease/oil or soups or gravy.

FIGS. 1A-1C illustrate perspective, side and closed perspective views of a kitchen utensil 10 in a spatula-tong type configuration according to the teachings herein. Kitchen utensil 10 includes a pair of arms 12 (with optional grip members 14) having a first and second ends 13A and 13B, first ends 13A forming a cantilevering V-joint 16 (with an optional spring therein, not shown) that facilitates inward and outward movement of arms 12 in varying degrees when an external force is applied on the arms (FIG. 1C, arrows). Utensil 10 further includes a spatula head member 18 located at and engaging the second ends of the pair of arms 12 such that spatula head member 18 forms a holding configuration (FIG. 1C) when the arms are moved inwardly when an external force is applied. Spatula head member 18 is formed from a planar portion or hammock 19 between two interleaving and cooperating members 20 to form a spatula configuration.

In this example embodiment, kitchen utensil 10 utilizes silicone overmolded pincers or sidewall members 20, which form spatula head member 18, on the ends of arms 12 to create the unifying spatula hammock or head member 18. In a related embodiment, there are ergonomic silicone handles that make device 10 more comfortable to use. In one example embodiment, located in between the handles or arms 12, there is a spring loaded joint 16 that operates to make hammock 19 function as taunt as possible to simulate the spatula confirmation. In a related embodiment, arms or tongs 18 are designed into a slight arc to make it easier on the user's wrists when flipping food in a skillet, pan, or on the grill. Lastly, arms or tongs 12 could either be made of metal, plastic or stainless steel, with steel being optimal for functionality and style. In another related embodiment, each of arms 12 is configured to be axially extendable, in case user has to reach back into an oven or wants to be extended back from a frying pan.

In this example embodiment, spatula head member 18 or hammock 18 are made from a material selected from the group consisting of silicone, metal, and ceramic. In a related embodiment, spatula head member 18 is formed from a metal or silicone mesh to form a spatula configuration. In still another embodiment, the spatula head member 18 is formed from a metal or plastic substrate overmolded in silicone to form a spatula configuration between the second ends of the arm.

Referring now to FIGS. 2A-2B, there is illustrated a perspective view and an exploded view, respectively, of a second embodiment of a kitchen utensil 100 in a spatula-tong configuration according to the teachings herein. Kitchen utensil 100 includes a pair of arms 112 (with optional grip members 114) having a first and second ends 113A and 113B, first ends 113A forming a cantilevering V-joint 116 (with an optional spring therein, not shown) that facilitates inward and outward movement of arms 112 in varying degrees when an external force is applied on the arms. Utensil 100 further includes a spatula head member 118 located at and engaging the second ends of the pair of arms 112 such that spatula head member 118 forms a holding configuration when the arms are moved inwardly when an external force is applied. Spatula head member 118 is formed from a planar portion or hammock 119 between two interleaving and cooperating members 120 to form a spatula configuration.

In this example embodiment, kitchen utensil 100 utilizes silicone overmolded pincers or sidewall members 120, which form spatula head member 118, on the ends of arms 112 to create the unifying spatula hammock or head member 118. The spatula head member can also be formed from one of a metal or plastic substrate overmolded in silicone to form a spatula configuration between the second ends of the arms. In some embodiments, the spatula head member is a thin plastic substrates overmolded with silicone. Such a configuration provides the desired flexibility and desired rigidity. The plastic substrate can help the spatula spring to a flat portion making it more effective when using it as a spatula.

In a related embodiment, there are ergonomic silicone handles that make device 100 more comfortable to use. In one example embodiment, located in between the handles or arms 112, there is a spring loaded joint 116 that operates to make hammock 119 function as taunt as possible to simulate the spatula confirmation.

In this example embodiment, a spring member 117 is bias to outwardly and laterally extend the second ends of the pair of the arms. In a related embodiment, spring member 117 is bias to inwardly and laterally compress the second ends of the pair of the arms toward each other. In this example embodiment, each arm is configured to be axially extendable.

In this example embodiment, a distal end of each of sidewall members 120 includes a gripping member 126 that extends outwardly from the distal end of each sidewall member and the spatula configuration, with each of the gripping members further extending inwardly towards each other. Inwardly extending portion 128 of gripping members 126 help to grasp individual food items when the spatula head member 120 and the tongs utensil is used in an upside down manner.

FIG. 3 illustrates a perspective view of an embodiment of a spatula-tong head member 200 configured for mounting on an existing pair of tong arms of a tongs utensil. In this example embodiment, spatula head member 200 is configured to be fitted on an open end of a tongs utensil having a spring biased v-joint cantilevering configuration. Spatula head member 200 includes a flexible planar portion 219 bounded by two elongate side wall members 220 with the spatula head member 200 having a proximal end 222 and a distal end 224 with the distant end of spatula head member 200 configured to be located at and engaged with an open end of the tongs utensil at each elongate side wall member 220. Spatula head member 200 forms a spatula confirmation when the tong arms are in an open position. A distal end of each of sidewall members 220 including a gripping member 226 that extends outwardly from the distal end of each sidewall member 220 and the spatula configuration.

In a related embodiment, each sidewall member 220 is configured to include an elongate channel that is flexible to facilitate positioning of spatula head member 200 over each of the second ends of the tongs utensil to thereby form the spatula configuration. In this example embodiment, a distal end of each of sidewall members 220 includes a gripping member 226 that extends outwardly from the distal end of each sidewall member and the spatula configuration, with each of the gripping members further extending inwardly towards each other. Inwardly extending portion 228 of gripping members 226 help to grasp individual food items when the spatula head member 220 and the tongs utensil is used in an upside down manner.

Referring FIGS. 4-8 illustrate top, side, back, bottom and front assembly views of the second embodiment of a kitchen utensil in a spatula-tong configuration according to the teachings herein.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A kitchen utensil comprising:
    a pair of arms having a first and second ends, the first ends of the pair of arms forming a cantilevering V-joint that facilitates lateral inward and outward movement of each of the arms when an external force is applied on the arms; and
    a spatula head member having a flexible planar portion bounded by two elongate side wall members, the spatula head member having a proximal end and a distal end, wherein the distal end is located at and engages the second ends of the pair of arms at each elongate side wall member, wherein the cantilevering V-joint includes a spring member dispose therein to outwardly bias the second ends of the pair of arms such that the spatula head member forms a spatula configuration when the pair of arms are extended laterally outward.

2. The kitchen utensil of claim 1 wherein the spatula head member is formed from two interleaving and cooperating members to form a spatula configuration when the arms are moved laterally outward and form a flexible holding configuration when the arms are moved laterally inward.

3. The kitchen utensil of claim 1 wherein a distal end of each of the sidewall members includes a gripping member that extends outwardly from the distal end of each sidewall member and the spatula configuration.

4. The kitchen utensil of claim 1 wherein a distal end of each of the sidewall members includes a gripping member that extends outwardly from the distal end of each sidewall member and the spatula configuration, wherein each of the gripping members further extend inwardly towards each other.

5. The kitchen utensil of claim 1 wherein each arm is configured to be axially extendable.

6. The kitchen utensil of claim 1 wherein the spatula head member is formed from one of a metal or silicone material to form a spatula configuration between the second ends of the arms.

7. The kitchen utensil of claim 1 wherein the spatula head member is formed from one of a metal or plastic substrate overmolded in silicone to form a spatula configuration between the second ends of the arm.

8. A kitchen utensil comprising:
    a pair of arms having a first and second ends, the first ends of the pair of arms forming a cantilevering V-joint that facilitates lateral inward and outward movement of each of the arms when an external force is applied on the arms; and
    a spatula head member having a flexible planar portion bounded by two elongate side wall members, the spatula head member having a proximal end and a distal end, wherein the distal end is located at and engages the second ends of the pair of arms at each elongate side wall member, wherein the spatula head member forms a spatula configuration when the pair of arms are extended laterally outward.

9. The kitchen utensil of claim 8 wherein the cantilevering V-joint includes a spring member disposed therein allowing inward and outward movement of the arms in varying degrees.

10. The kitchen utensil of claim 9 wherein the spring member is adapted to bias outwardly and laterally extend the second ends of the pair of the arms.

11. The kitchen utensil of claim 8 wherein a distal end of each of the sidewall members includes a gripping member that extends outwardly from the distal end of each sidewall member and the spatula configuration.

12. The kitchen utensil of claim 8 wherein a distal end of each of the sidewall members includes a gripping member that extends outwardly from the distal end of each sidewall member and the spatula configuration, each of the gripping members further extending inwardly towards each other.

13. The kitchen utensil of claim 8 wherein the spatula head member is formed from two interleaving and cooperating members to form a spatula configuration when the arms are moved laterally outward and a flexible holding configuration when the arms are moved laterally inward.

14. The kitchen utensil of claim 8 wherein each arm is configured to be axially extendable.

15. The kitchen utensil of claim 8 wherein the spatula head member is made from a flexible material selected from the group consisting of silicone, metal, and plastic.

16. The kitchen utensil of claim 8 wherein the spatula head member is formed from one of a metal or silicone material to form a spatula configuration between the second ends of the arms.

17. A spatula head member configured to be fitted on an open end of a tongs utensil having a spring biased V-joint cantilevering configuration, the spatula head member comprising:

a spatula head member having a flexible planar portion bounded by two elongate side wall members, the spatula head member having a proximal end and a distal end, wherein the distal end of the spatula head member is configured to be located at and engaged with an open end of the tongs utensil at each elongate side wall member, wherein the spatula head member forms a spatula configuration when the tongs are in an open position, a distal end of each of the sidewall members including a gripping member that extends outwardly from the distal end of each sidewall member and the spatula configuration.

18. The spatula head member of claim 17, wherein each sidewall member is configured to include an elongate channel that is flexible to facilitate positioning over each of the second ends of the tongs utensil to thereby form the spatula configuration.

19. The spatula head member of claim 17, wherein each sidewall member is configured to facilitate positioning at each of the second ends of the tongs utensil to thereby form the spatula configuration.

* * * * *